(12) United States Patent
Andersson et al.

(10) Patent No.: US 11,544,076 B2
(45) Date of Patent: Jan. 3, 2023

(54) ONLINE RECONFIGURATION OF A NODE IN A PROCESS CONTROL SYSTEM

(71) Applicant: ABB Schweiz AG, Baden (CH)

(72) Inventors: Staffan Andersson, Lund (SE); Stefan Sallberg, Malmö (SE)

(73) Assignee: ABB Schweiz AG, Baden (CH)

( * ) Notice: Subject to any disclaimer, the term of this patent is extended or adjusted under 35 U.S.C. 154(b) by 339 days.

(21) Appl. No.: 16/799,406

(22) Filed: Feb. 24, 2020

(65) Prior Publication Data
US 2020/0278874 A1 Sep. 3, 2020

(30) Foreign Application Priority Data
Mar. 1, 2019 (EP) ..................................... 19160294

(51) Int. Cl.
| | | |
|---|---|---|
| G06F 9/445 | (2018.01) | |
| G06F 9/30 | (2018.01) | |
| G06F 9/50 | (2006.01) | |
| G06F 9/52 | (2006.01) | |
| G06F 9/54 | (2006.01) | |

(52) U.S. Cl.
CPC ...... G06F 9/44505 (2013.01); G06F 9/30087 (2013.01); G06F 9/5072 (2013.01); G06F 9/52 (2013.01); G06F 9/54 (2013.01)

(58) Field of Classification Search
CPC .. G06F 9/44536; G06F 9/448; G06F 9/30087; G06F 9/52; G06F 9/54; G06F 9/541; G06F 9/543; G06F 9/547; H04L 41/0803; H04L 41/0813; H04L 41/082
See application file for complete search history.

(56) References Cited

U.S. PATENT DOCUMENTS

| 7,415,707 B2 * | 8/2008 | Taguchi | .................... | G06F 8/61 717/174 |
| 8,539,050 B2 * | 9/2013 | Tow | ......................... | G06F 8/65 717/176 |

(Continued)

OTHER PUBLICATIONS

European Extended Search Report Applcation No. 19160294.5 Completed: Aug. 2, 2019; dated Aug. 12, 2019 8 Pages.

*Primary Examiner* — Raymond N Phan
(74) *Attorney, Agent, or Firm* — Whitmyer IP Group LLC

(57) ABSTRACT

A method for online reconfiguration of a node in a process control system including components. Each component is a separate executable running in a separate operating system process as provided by a real time operating system of the node. A method is performed by a node manager of the node to be reconfigured. The method includes triggering, based on new configuration data and whilst running the at least one of the components to be reconfigured, creation of a new configuration entity for each of the at least one of the components to be reconfigured, the creating involving implementing, by each new configuration entity, a part of the reconfiguration corresponding to its component to be reconfigured. The method includes triggering synchronization of runtime data in each new configuration entity with runtime data of its corresponding existing configuration entity. The method includes triggering replacement of the existing configuration entity with its new configuration entity and thereby reconfiguring the node.

18 Claims, 10 Drawing Sheets

(56) References Cited

U.S. PATENT DOCUMENTS

| | | | | |
|---|---|---|---|---|
| 8,898,658 | B2* | 11/2014 | Ciccone | G06F 9/445 |
| | | | | 717/172 |
| 8,972,968 | B1* | 3/2015 | Vichare | G06F 8/65 |
| | | | | 717/170 |
| 10,382,262 | B1* | 8/2019 | Gupta | H04L 41/0813 |
| 10,389,735 | B1* | 8/2019 | Bhattacharjya | H04L 63/102 |
| 10,671,376 | B2* | 6/2020 | Xu | G06F 8/656 |
| 11,182,142 | B2* | 11/2021 | Mitra | G06F 8/60 |
| 11,281,493 | B2* | 3/2022 | Leyrer | G06F 9/5016 |
| 2003/0101245 | A1 | 5/2003 | Srinivasan et al. | |

* cited by examiner

ONLINE RECONFIGURATION OF A NODE IN A PROCESS CONTROL SYSTEM

TECHNICAL FIELD

Embodiments presented herein relate to a method, a node manager, a computer program, and a computer program product for online reconfiguration of a node in a process control system.

BACKGROUND

Process control systems of today have a controller centric architecture, i.e. each controller executes a set of control logic applications using input/output (I/O) interfaces and devices connected to the controller, or via fieldbuses connected to the controller. I/O interfaces and devices are configured and scanned by the controller, which makes the controller dependent on knowledge about the hardware topology as well as I/O interface, device and fieldbus specific implementations. Access of I/O interfaces and device data from upper system levels is routed through the controller, and sometimes requires modifications of the control logic.

During an online reconfiguration of a controller, gateway or device there might be a small unneglectable risk that the introduced changes can result in an unexpected behavior, e.g. due to side effects in other parts of configuration. This might lead to unforeseen and undesirable impact on the control system runtime behavior and dynamics, which in worst case can result in production losses.

Hence, there is still a need for improved configuration processes of process control systems.

SUMMARY

An object of embodiments herein is to provide efficient configuration of a process control system.

According to a first aspect there is presented a method for online reconfiguration of a node in a process control system. The node comprises components. Each component is a separate executable running in a separate operating system process as provided by a real time operating system of the node. The method is performed by a node manager of the node to be reconfigured. The method comprises triggering, based on new configuration data and whilst running the at least one of the components to be reconfigured, creation of a new configuration entity for each of the at least one of the components to be reconfigured, the creating involving implementing, by each new configuration entity, a part of the reconfiguration corresponding to its component to be reconfigured. The method comprises triggering synchronization of runtime data in each new configuration entity with runtime data of its corresponding existing configuration entity. The method comprises triggering replacement of the existing configuration entity with its new configuration entity and thereby reconfiguring the node.

According to a second aspect there is presented a node manager for online reconfiguration of a node in a process control system. The node manager comprises processing circuitry. The processing circuitry is configured to cause the node manager to perform a method according to the first aspect.

According to a third aspect there is presented a process control system comprising at least one node and node manager according to the second aspect.

According to a fourth aspect there is presented a computer program for online reconfiguration of a node in a process control system, the computer program comprising computer program code which, when run on a node manager, causes the node manager to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this provides efficient configuration of the node in the process control system.

Advantageously this enables online reconfiguration of a singular component or a set of components in non-redundant controllers, gateways, and devices as well as redundant controllers, gateways, and devices.

Advantageously this can be combined with performance evaluation of the new components.

Advantageously, such evaluation of the control system behavior can be used to avoid unforeseen, and undesirable, impacts on the control system runtime behavior and dynamics.

Advantageously, the reconfiguration can thereby be supervised and evaluated before it is accepted or rejected.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, process block, etc." are to be interpreted openly as referring to at least one instance of the element, apparatus, component, means, module, step, etc., unless explicitly stated otherwise. The process blocks of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any process block or feature illustrated by dashed lines should be regarded as optional.

Figure 1:
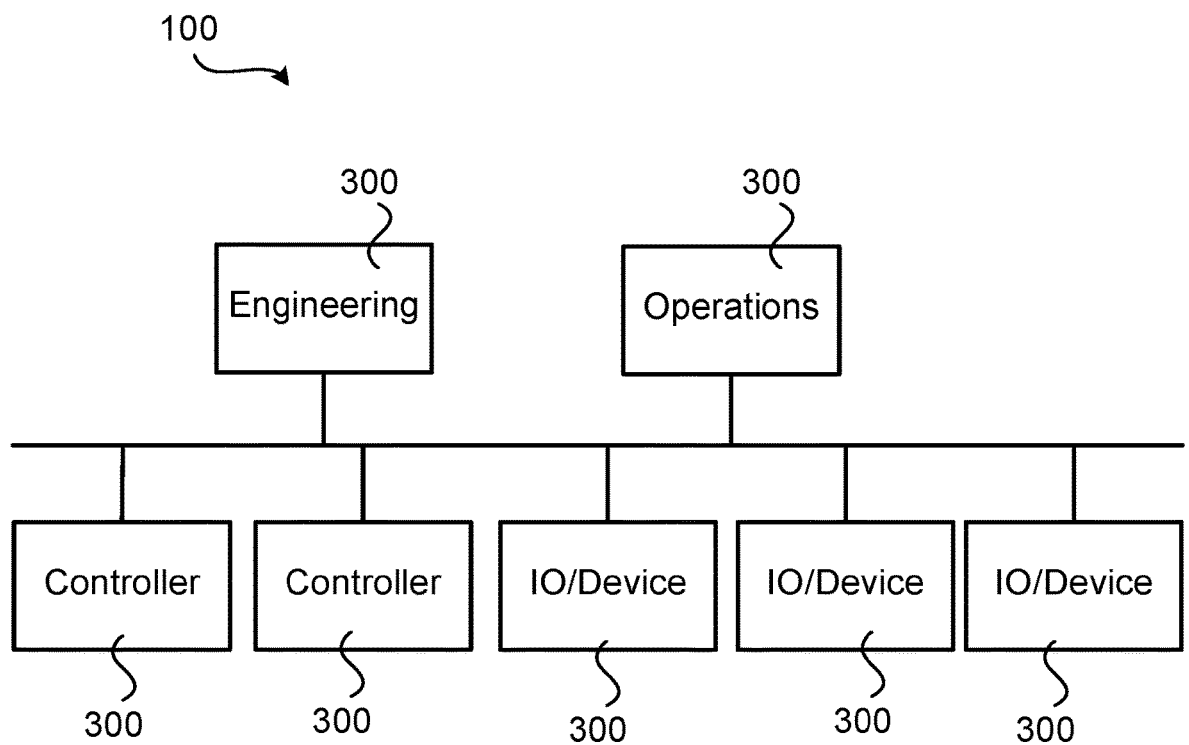
FIG. 1 schematically illustrates a network-centric architecture of a process control system.

In a network-centric architecture of the process control system 100 as illustrated in FIG. 1, input/output (I/O) entities and devices, being examples of nodes 300, are not "owned" by a controller, as in a controller-centric process control system architecture. The engineering tool for I/O entity and device configuration deploys configuration data to the I/O entities and devices without involving a (central) controller. Controllers are focused on execution of control logic and can access I/O signals from any I/O entity or device. The network-centric process control system architecture provides a system-wide easy access to I/O entity information and device information from upper system levels, such as Operations and Engineering, without any routing of information through the controller. The control logic does not have to be updated to access I/O entity information and device information.

In general terms, the exchange of process data between control services is handled by middleware. Data is then represented as signals. The control services represent the principal services in controllers, gateways and devices, e.g. execution of control logic in a controller, scanning of I/O and field devices in a fieldbus gateway, managing the device functionality in a device, etc.

Control services are typically allocated in different nodes, with one or multiple control services per node.

Figure 2:
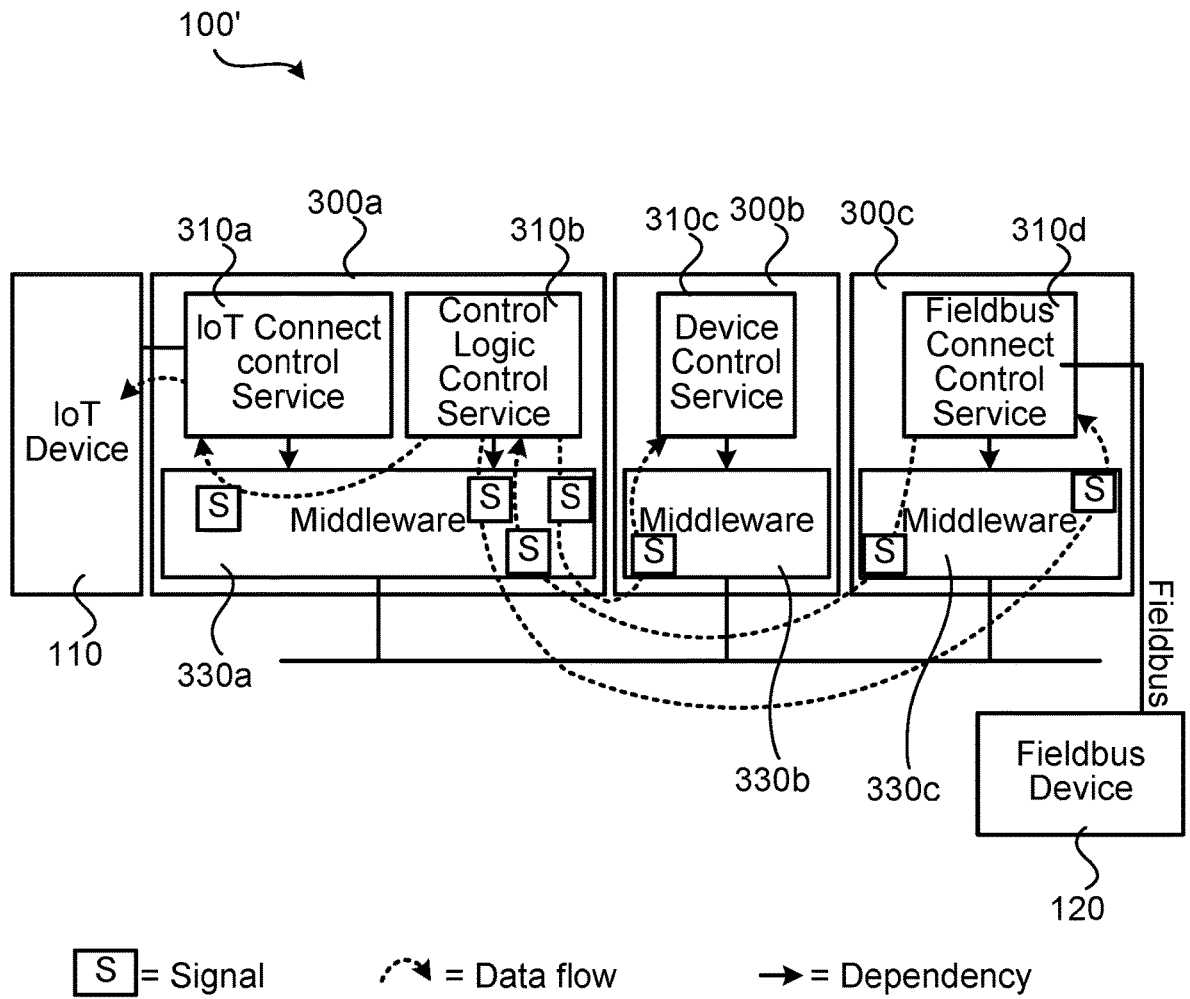
FIG. 2 schematically illustrates control services allocated to different nodes.

In general terms, a control service has no knowledge about where other control services that it interacts with are allocated. This is handled by the middleware and is transparent to the control service. FIG. 2 shows an example of a process control system 100' with four control services 310a, 310b, 310c, 310d executing in three nodes; such as in a node 300b being a device, a node 300c being a fieldbus gateway and a node 300a being a controller, where the node 300a hosts two control services 310a, 310b, where the node 300b hosts one control service 310c, and where the node 300c hosts one control service 310d. Nodes 300a, 300b, and 300c each have a corresponding a middleware, such as middleware 330a, 330b and 330c that handle the signal exchange between the control services in the different nodes as well as between control services allocated in the same node (i.e. in the controller 330a in this example).

Interactions with controllers, devices etc. not using middleware, are handled by control services specific for the communication protocol needed for the interaction, as illustrated in FIG. 2. An Internet of Things (IoT) connect control service 310 operatively connects the controller 300a to IoT devices 110, and a fieldbus connect control service 310 of a fieldbus gateway 300c operatively connects the fieldbus gateway to fieldbus devices 120, e.g. Profibus devices. Such control services can execute in any node, e.g. in the controller node, as the IoT connect control service, or in a separate node, as the fieldbus connect control service.

Middleware and control services might be provided as separate executables, running in separate operating system processes, for memory protection and isolation of faults. A control service interacts with middleware through inter process communication.

Control services are configured by a set of engineering tools; one tool for each control service type, e.g. one engineering tool for control logic configuration and another tool for I/O entity configuration and device configuration. This gives an isolation of e.g. control logic engineering from I/O engineering. That is, the control logic can be completely engineered without knowing where it will be executed, or how/where the I/O entities and devices are connected.

Middleware is configured by a middleware configuration component, which uses signal definitions provided by the engineering tools to create the middleware configuration. The middleware configuration is sent with the control service configuration and forwarded to the middleware by the control services.

In general terms, a signal defines a contract/interface between a publisher and a subscriber for the process data to be exchanged. A signal comprises the following attributes: system unique signal identity (ID), data type for the signal value, range and engineering unit for the signal value (for analog signals only), override value (used by the signal subscriber in case of bad quality), and substitute value (used by the signal publisher in case of bad quality). Signals are configured and connected to control logic variables and I/O channels, in the engineering tools for control logic and I/O engineering, and downloaded to the nodes. It is the responsibility of the middleware configuration component to guarantee that the signal IDs are unique within the system.

During an online reconfiguration of a controller, gateway, or device there could be a small unneglectable risk that the new configuration has an unforeseen and undesirable impact on the control system runtime behavior and dynamics, which in worst case can result in production losses.

The herein disclosed embodiments enable online reconfiguration of a singular component, or a set of components, in non-redundant controllers, gateways and devices, as well as redundant controllers, gateways and devices. The control system behavior can be evaluated during a control service firmware upgrade to avoid unforeseen and undesirable impact on the control system runtime behavior and dynamics due to the online reconfiguration. The reconfiguration can thus be supervised and evaluated before it is accepted or rejected.

Figure 3:
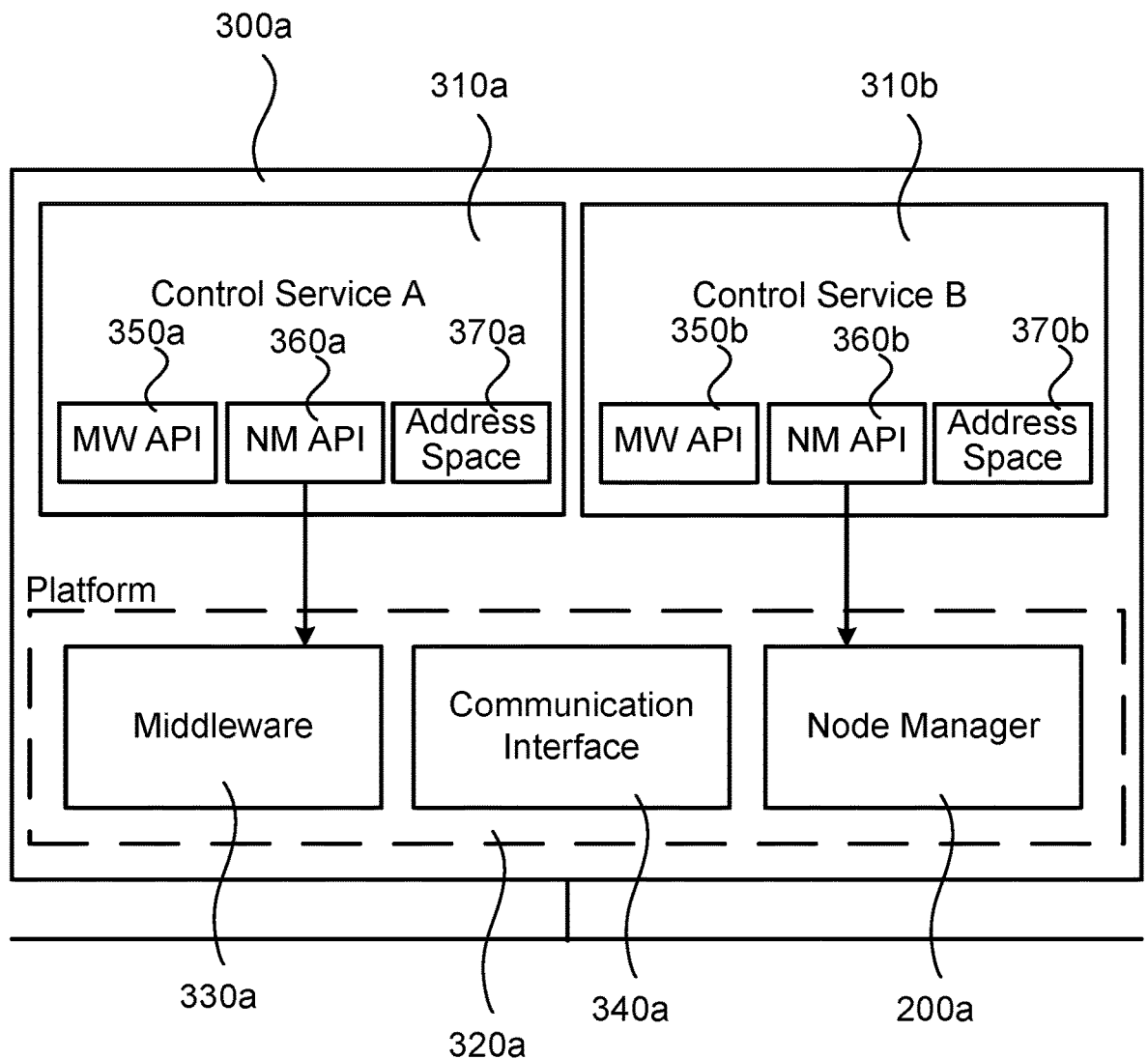
FIG. 3 schematically illustrates a node architecture according to an embodiment.

FIG. 3 schematically illustrates the component architecture for a node 300a in the process control system 100, 100'. In some examples the node 300a is a controller, a gateway, or a process device.

The node 300a has one or multiple control service components 310a, 310b running on a platform component 320a. The platform component 320a comprises the following components: middleware 330a, a node manager 200a, and a communication interface 340a. In some examples the communication interface 340a comprises, or acts as, a vertical communication component.

Each component is a separate executable running in a separate operating system process provided by a real time operating system (not shown in the figure) of the node 300a. In some examples the at least one component to be reconfigured is a control service component and/or a platform component 320a on which the control service component is running.

Each component might comprise middleware 330a for signal exchange that makes it possible for, for example, any control service to access any signal in any other control service without knowledge of network layout, control service deployment, or control service internals.

The middleware 330a makes it possible to move a signal publisher from one node 300a to another node without affecting the subscribers, and vice versa.

To simplify the control service implementation and to harmonize the control services behavior, each control service component 310a, 310b is provided with three subcomponents; middleware (MW) application programming interface (API) 350a, 350b, node manager (NM) API 360a, 360b, and an address space 370a, 370b to be used in the control service interactions with the platform component 320a. These subcomponents can also be copied to be part of the platform components. That is, in some examples the control service component comprises a middleware API, a node manager API, and an address space.

Each component has its own database for runtime and configuration data. That is, there is no separate component acting as a central database used by all components. The component runtime database is optimized for the most frequent data accesses, e.g. for control logic execution and allows control services to have a specific information model, e.g. IEC 61131-3 information model with program organization units (POUs), variables, etc. Information not needed by other components is hidden inside the control service. In this respect, the database might be provided as anything that is configured to store data such as a traditional database, a class, a table, or any other type of suitable data structure.

The node manager 200a is configured for the startup of all components in the node 300, and for supervision of the runtime behavior, health, etc. for the components. The node manager 200a might be configured to, depending on its configuration, stop or restart execution of components.

The node manager 200a is configured for performing online configuration, online reconfiguration, as well as the evaluation thereof, in the node 300a.

There are two configuration scenarios for the nodes; configuration of an empty node, and reconfiguration of a running node, i.e. in parallel with the node operation, with a minimum of disturbances on the operation, no latencies, no bumps on outputs, etc. The following description is focused on the reconfiguration, as configuration can be considered as a simplified variant of reconfiguration.

The example embodiments disclosed herein in particular relate to mechanisms for online reconfiguration of a node 300a) in a process control system 100, 100'. In order to obtain such mechanisms there is provided a node manager 200a, a method performed by the node manager 200a, a computer program product comprising code, for example in the form of a computer program, that when run on a node manager 200a, causes the node manager 200a to perform the method.

Figure 4A:
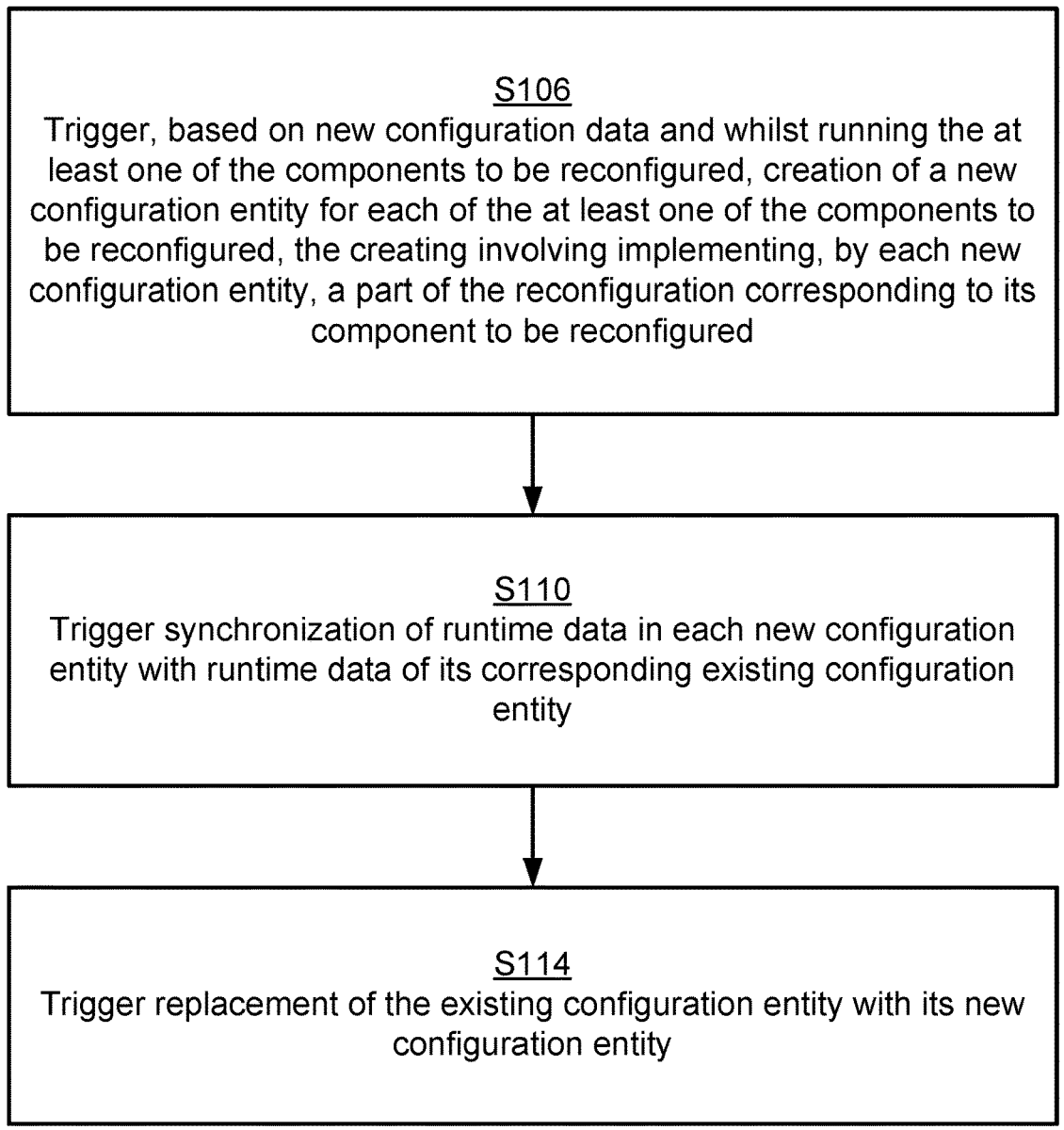
FIGS. 4A and 4B are flowcharts of methods according to embodiments.

FIG. 4A illustrates, in accordance with the exemplary aspects of the disclosure, a method for online reconfiguration of a node 300 in a process control system 100, 100', wherein the node 300a comprises components, where each component is a separate executable running in a separate operating system process as provided by a real time operating system of the node 300a. In an exemplary embodiment, the method is performed by a node manager 200a of the node 300a to be reconfigured. The method is advantageously provided as a computer program 1020.

The process starts in process block 106, by triggering, based on new configuration data and whilst running the at least one of the components to be reconfigured, creation of a new configuration entity for each of the at least one of the components to be reconfigured, the creating involving implementing, by each new configuration entity, a part of the reconfiguration corresponding to its component to be reconfigured, as further described below and in greater detail in conjunction with below figures.

Next, in process block S110, runtime data in each new configuration entity is synchronized with runtime data of its corresponding existing configuration entity, as further described below and in greater detail in conjunction with below figures.

Next, in process block S114, the existing configuration entity is replaced with its new configuration entity and thereby reconfiguring the node 300a, as further described below and in greater detail in conjunction with below figures.

Figure 4B:
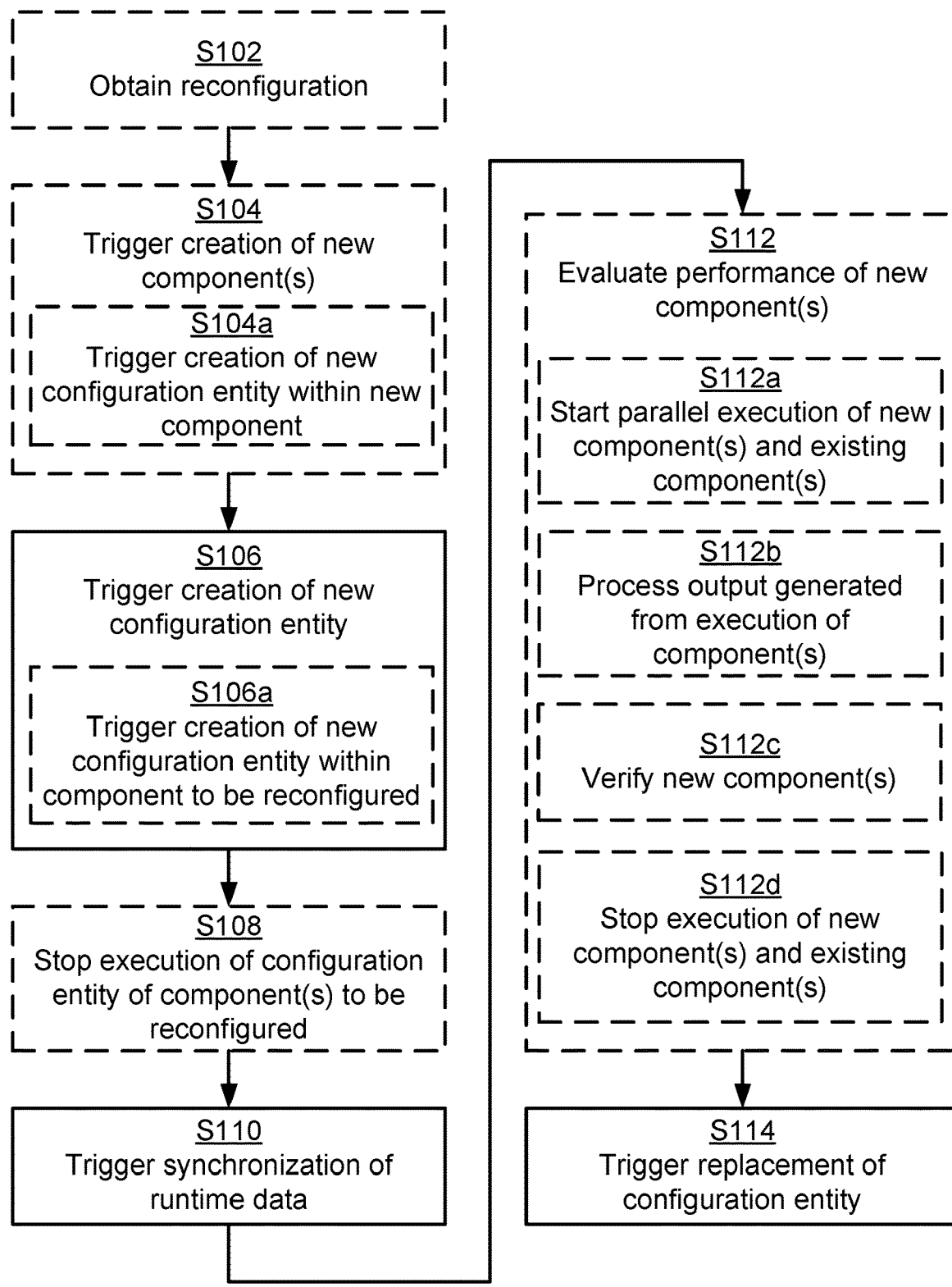

FIG. 4B is a flowchart further illustrating embodiments of methods for online reconfiguration of a node 300 in a process control system 100, 100' shown in FIG. 4A. Referring to FIG. 4B, the node 300a comprises components. Each component is a separate executable running in a separate operating system process as provided by a real time operating system of the node 300a. In an exemplary embodiment, the methods are performed by the node manager 200a of the node 300a to be reconfigured. The methods are advantageously provided as computer programs 1020.

The reconfiguration might be orchestrated from a reconfiguration tool. The reconfiguration tool might thus be used to transfer new configuration data to the node 300a for the node 300a to be reconfigured, and for sending reconfiguration commands during the reconfiguration process as defined by below process blocks S102-S114. Hereinafter the term reconfiguration will thus be understood as referring to new configuration data.

The node manager 200a is thus the receiver of the reconfiguration commands and the new reconfiguration (i.e., the new configuration data, as explained above) and is configured to execute the reconfiguration commands by performing the method according to below process blocks S102-S114. Hence, according to an embodiment the node manager 200a is configured to perform (optional) process block S102:

S102: The node manager 200a obtains a reconfiguration (i.e., defined by new configuration data, as explained above) for at least one of the components of the node 300a.

The reconfiguration granularity for a component is defined by the component type and its corresponding engineering tool. E.g. one control logic control service type supports reconfiguration of a singular control logic task, while another control service type requires all control logic tasks to be reconfigured at each reconfiguration.

The configuration data for a component is packaged into a set of configuration files, preferably according to the reconfiguration granularity for the component, e.g. one configuration file per control logic task. One or multiple versions of the configuration files are stored in the node 300a and executed by configuration entities within the nodes 300a. The configuration files for the running component versions are used e.g. in case of a node restart after power fail. A configuration file always contains the complete configuration for the entity to be configured, e.g. for the complete control logic task, i.e. the configuration files are non-incremental.

S106: The node manager 200a triggers, based on new configuration data and whilst running the at least one of the components to be reconfigured, creation of a new configuration entity for each of the at least one of the components to be reconfigured, the creating involving implementing, by each new configuration entity, a part of the reconfiguration corresponding to its component to be reconfigured. The node manager API forwards reconfiguration to the subcomponent (s) within the component to be reconfigured.

The execution of all existing configuration entities which are to be reconfigured might then be stopped. That is, according to an embodiment the node manager 200a is configured to perform (optional) process block S108:

S108: The node manager 200a triggers execution of each existing configuration entity of the at least one component to be reconfigured to be stopped.

The synchronization of runtime data in the new configuration entity/entities with runtime data from the existing configuration entity/entities is then be started. That is, the node manager 200a is configured to perform process block S110:

S110: The node manager 200a triggers synchronization of runtime data in each new configuration entity with runtime data of its corresponding existing configuration entity.

After completed synchronization, the new configuration entity/entities is/are started, and the corresponding existing configuration entity/entities is/are deleted. That is, the node manager 200a is configured to perform process block S114:

S114: The node manager 200a triggers the existing configuration entity to be replaced with its new configuration entity and thereby reconfigures the node 300a. In some aspects the node manager 200a reconfigures the node 300a by starting execution of each new configuration entity upon having deleted its corresponding existing configuration entity.

Multiple control services and multiple platform components within a node 300 can be configured in parallel. The node manager 200a is then configured to synchronize the thus parallel reconfiguration within the node 300a. The control services and platform components are then configured to handle inconsistencies during a reconfiguration, e.g. when dependent parallel reconfigurations are not finished at exactly the same time.

Different nodes 300a can be reconfigured in parallel, and in any order. It might then be the responsibility of the engineering tool to synchronize concurrent configuration of multiple nodes 300.

Embodiments relating to further details of online reconfiguration of a node 300a in a process control system 100, 100' as performed by the node manager 200a will now be disclosed.

Figure 5:
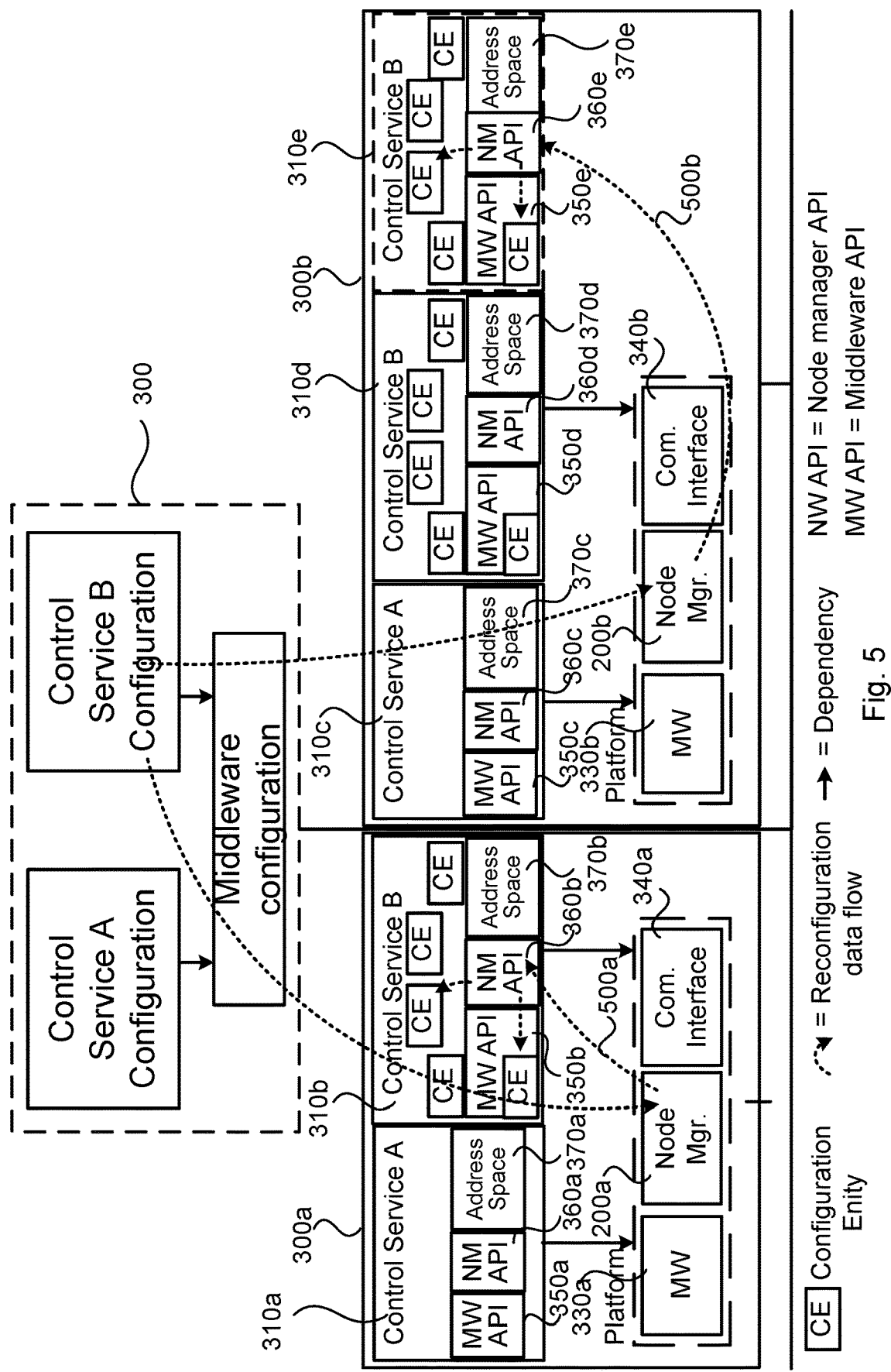
FIG. 5 schematically illustrates reconfiguration data flow for reconfiguration of a control service according to an embodiment.

Two alternatives for a component reconfiguration shown in FIG. 4B will now be disclosed in conjunction with FIG. 5. As shown in FIG. 5, node 300a is reconfigured according to the first reconfiguration alternative, and node 300b is reconfigured according to the second alternative. In both the first alternative and the second alternative, a new configuration entity is created while the existing configuration entity is still running, as in above process block S106. Node 300b is identical to node 300a and thus comprises entities 200b, 310c, 310d, 330b, 340b, 350c, 350d, 360c, 360d, 370c, 370d corresponding to entities 200a, 310a, 310b, 330a, 340a, 350a, 350b, 360a, 360b, 370a, 370b as disclosed above, and in addition comprises control service 310e. As will be further disclosed below, control service 310e is a component twin of control service 310b of node 300b, where control service 310b is to be reconfigured. Control service 310e comprises a MW API 350e, a NM API 360e and an address space 370e.

According to the first alternative, the reconfiguration is handled internally in the component to be reconfigured, in FIG. 5 illustrated by control service 310b of node 300a. Hence, according to an embodiment, each new configuration entity (denoted CE in the figures) is created within the component to be reconfigured. That is, according to this embodiment the node manager 200a is configured to perform (optional) process block S106a as part of process block S106, as shown in FIG. 4B.

S106a: The node manager 200a triggers each new configuration entity to be created within the component to be reconfigured.

This alternative is particularly efficient for small reconfiguration changes, since the changes are made internally in the component.

According to the second alternative, the reconfiguration is handled by using a copy, hereinafter denoted a component twin, in FIG. 5 illustrated by control service 310e of node 300b, of the component to be reconfigured, in FIG. 5 illustrated by control service 310d of node 300b. The component twin is configured using the reconfiguration according to the new configuration files for the changed configuration, and the unchanged configuration files stored in the node 300, for the unchanged parts. Hence, according to an embodiment, the node manager 200a is configured to perform (optional) process block S104:

S104: The node manager 200a triggers, whilst running the at least one of the components to be reconfigured, creation of a new component for each of the at least one of the components to be reconfigured such that each new component is implementing a part of the reconfiguration corresponding to its component to be reconfigured. Each new component is a separate executable running in a separate operating system process as provided by the real time operating system of the node 300.

The second alternative is required for a reconfiguration with evaluation but can also be used for a reconfiguration without evaluation.

The component twin, i.e., the new component, is created in the same node as the component to be reconfigured, in FIG. 5 illustrated by node 300b. Further, according to an embodiment, each new configuration entity is created within the new component for each of the at least one of the components to be reconfigured. That is, according to this embodiment the node manager 200a is configured to perform (optional) process block S104a as part of process block S104:

S104a: The node manager 200a triggers creation of each new configuration entity within the new component for each of the at least one of the components to be reconfigured.

The reconfiguration is then in step S106 provided to the node manager API 360 of the new component.

FIG. 5 illustrates how configuration files are sent from a control service engineering tool to two nodes 300a, 300b. The node managers 200aa and 200ab forward, as symbolically shown by corresponding arrows 500a, 500b, the configuration files to their corresponding active control services 310b, 310d, or to the control service twin 310e, depending on the reconfiguration alternative. The node managers API 360b, 360e in the control service receives the configuration files and forwards them to the control service subcomponents to be reconfigured. For example, in case of a signal reconfiguration, a signal configuration file will be forwarded to the middleware API 350*b*, 350*e*, which will update the signal configuration in the middleware 330*a*, 330*b* (not illustrated in the figure).

Figure 6:
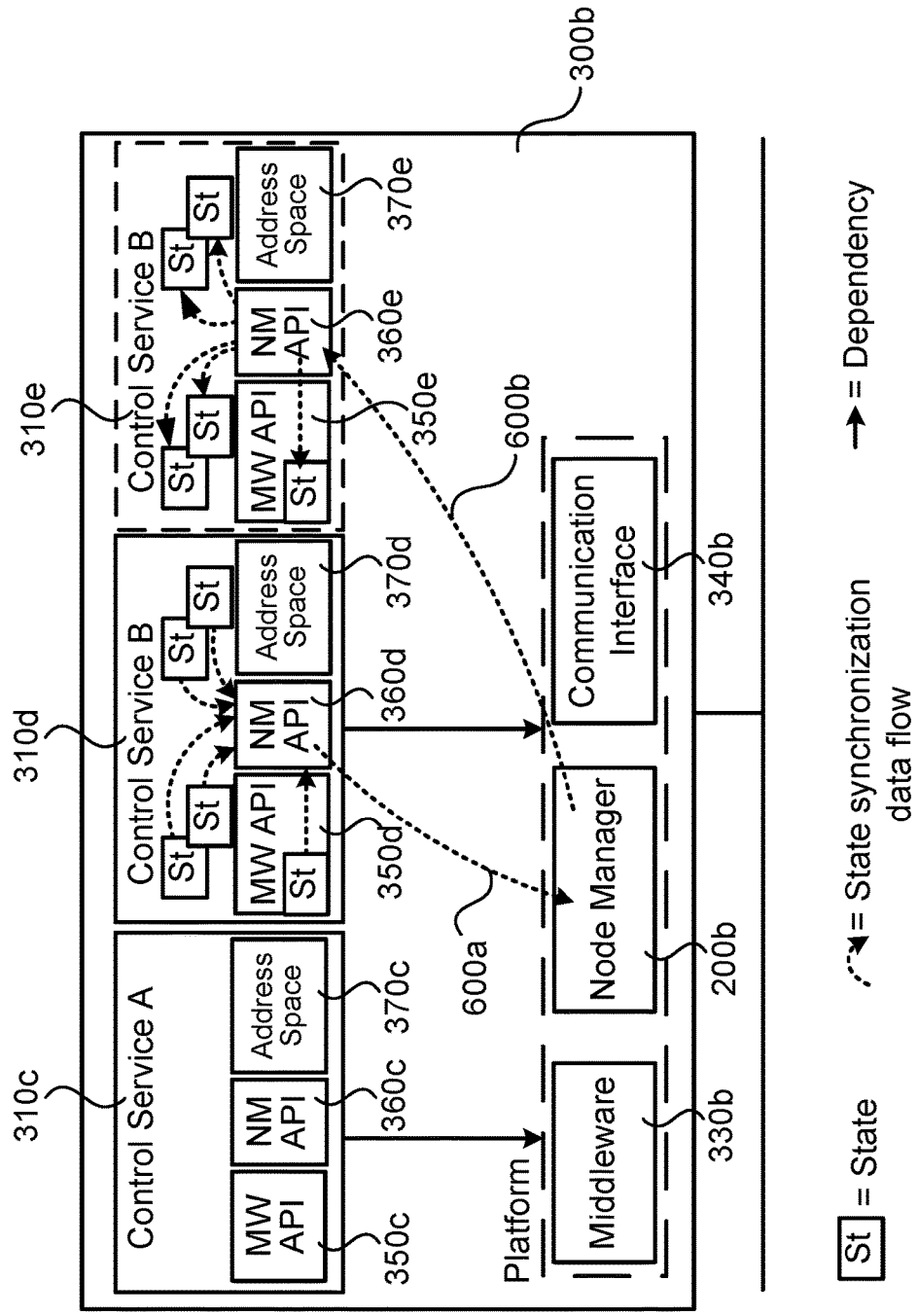
FIG. 6 schematically illustrates synchronization of runtime data between control services according to an embodiment.

The synchronization for the second alternative of FIG. 5 is schematically illustrated in FIG. 6, which thus shows a node 300*b* identical to node 300*b* of FIG. 5. All control logic variables etc. that contains states that must be retained, are copied from the existing component to the new component. In the second alternative the collected states are submitted to the node manager API 360*d* subcomponent, which packages them into a container and forwards them, as symbolically shown by arrow 600*a*, to the node manager 200*b*. The node manager 200*b* in turn forwards, as symbolically shown by arrow 600*b*, the container to the node manager API 360*e* in the new component 310*e* where they are used for update of the runtime data.

After completed synchronization, the new configuration entity/entities is/are used, and the existing configuration entity/entities is/are deleted. In the first alternative, this is performed within the existing component to be reconfigured. In the second alternative the new component(s) comprising the new configuration entity/entities is/are started and the existing component(s) comprising the existing configuration entity/entities is/are deleted.

To avoid unforeseen and undesirable impact on the control system runtime behavior and dynamics due to the online reconfiguration, in some aspects there is provided a mechanism for evaluation of the control system behavior during the online reconfiguration. In some aspects performance evaluation is performed by the reconfiguration tool. In other aspects the performance evaluation is performed internally in the node. Hence, according to an embodiment, the node manager 200*a* is configured to perform (optional) process block S112:

S112: The node manager 200*a* evaluates performance of each new component after synchronizing the runtime data but before replacing the existing configuration entity with its new configuration entity.

The evaluation is performed after the synchronization in process block S110.

Both the new component and the existing component to be upgraded are started and run in parallel. Hence, according to an embodiment, the node manager 200*a* is configured to perform (optional) process blocks S112*a*, S112*b* as part of process block S112:

S112*a*: The node manager 200*a* starts parallel execution of each new component and the at least one component to be reconfigured. Each new component and the at least one component to be reconfigured are thus run in parallel. Each new component and the at least one component to be reconfigured are run with same input. In some aspects, only output produced by running the at least one component to be reconfigured with the input is used in the process control system 100, 100'. That is, only the existing component controls the outputs.

In some aspects output generated from execution of the at least one component to be reconfigured is processed by the reconfiguration tool. In other aspects the output is processed internally in the node. In particular, according to an embodiment, the node manager 200*a* is configured to perform (optional) process block S112*b* as part of process block S112:

S112*b*: The node manager 200*a* processes in the control system 100, 100' an output generated from execution of the at least one component to be reconfigured.

Potential differences in runtime behavior and dynamics for one or multiple components can thereby be evaluated. In some aspects the reconfiguration tool verifies that the new component has acceptable behaviour, and thus performs as expected, by verifying that the new component produces expected output (for the given input). In other aspects verification is performed internally in the node. In particular, according to an embodiment, the node manager 200*a* is configured to perform (optional) process block S112*c* as part of process block S112:

S112*c*: The node manager 200*a* verifies that each new component produces expected output.

Once this has been verified the execution is stopped. In particular, according to an embodiment, the node manager 200*a* is configured to perform (optional) process block S112*d* as part of process block S112:

S112*d*: The node manager 200*a*, based on the verifying, stops execution of each new component and the at least one component to be reconfigured. In other words, the execution is stopped upon the reconfiguration tool, or the node manager 200*a*, having verified that each new component produces the expected output.

In case the reconfiguration tool, or the node manager 200*a*, cannot verify that the each new component produces the expected output the reconfiguration process is aborted. In case of abortion each new component is deleted and operation of the node 300 is continued using the corresponding component(s) that was/were to be reconfigured.

As will be further disclosed below, according to an embodiment, each new component is, via the node manager 200*a*, provided with the input from its corresponding component to be reconfigured.

In some aspects, differences due to reconfiguration of platform components cannot be evaluated. That is, according to an embodiment, the evaluating in S112 is only performed when it is the control service component that is to be reconfigured.

Once it has been verified that the new component, as resulting from the reconfiguration, operates as expected, the new component can be set to active, i.e. being the component that e.g. controls the outputs of the node 300 and is accessed through the namespace of the new component.

In a similar way as the node manager 200*a* and the node manager API 360 handle the synchronization of runtime data in the control services, the node manager 200*a* and the node manager API 360 handle the synchronization of the component inputs as well as synchronization of the component execution.

In the startup of the new component, the new component subscribes to input signals and registers its output signals in the middleware (using the middleware API), thereby enabling a fast switch to the new component. However, the new component will not use the received signals during the evaluation and will not publish its signals to the middleware 330*a*, which during the evaluation are blocked by middleware API. Instead the new component will use input signals received from the existing component. The middleware API and the address space in the existing component forwards all received inputs to the node manager API, which packages them into a version independent container and submits them to the node manager 200*a* which forwards them to the node manager API in the new component, which makes them available to the middleware API.

Figure 7:
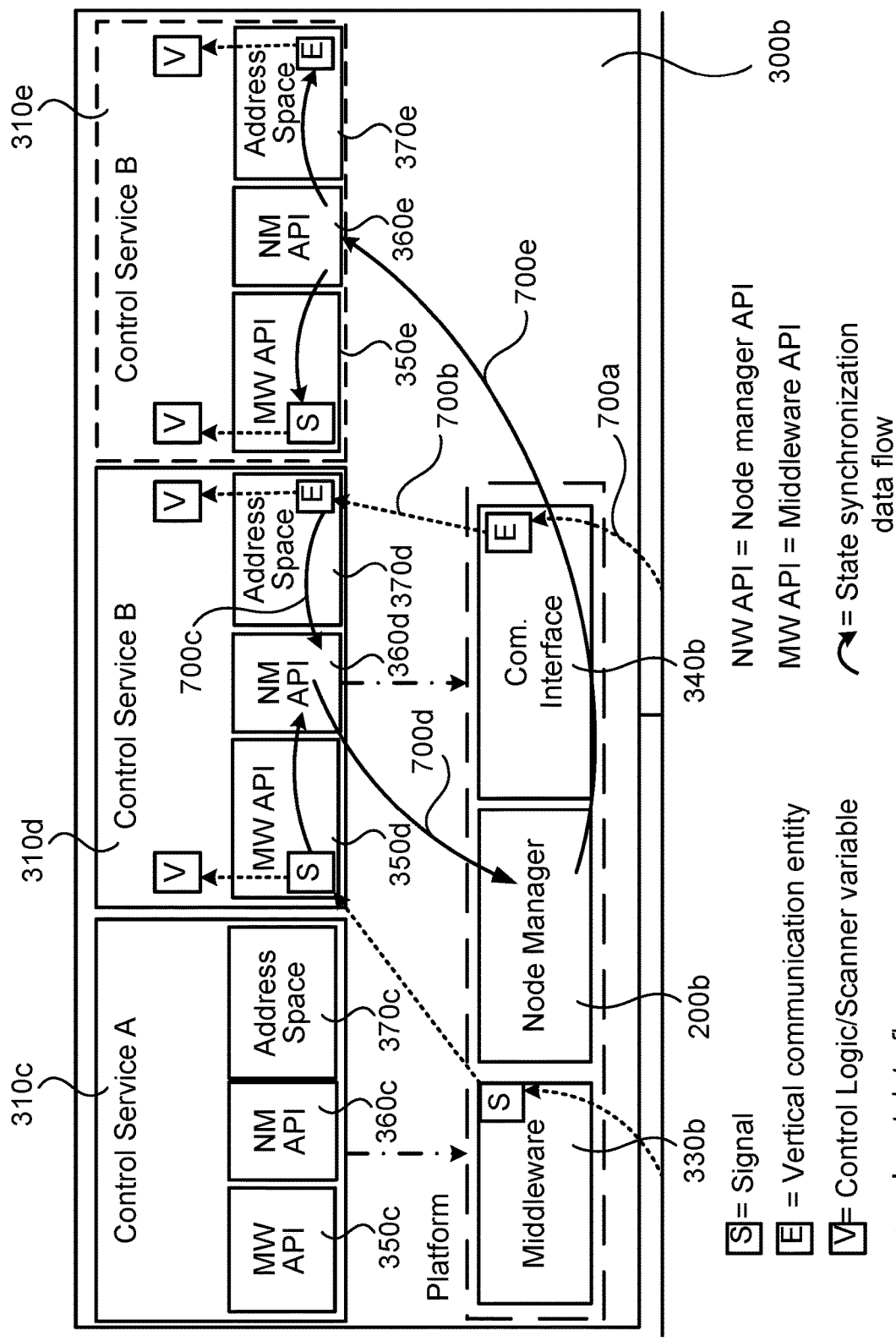
FIG. 7 schematically illustrates synchronization of input data according to an embodiment.

FIG. 7 further illustrates the synchronization of input data (as in process block S110 in FIGS. 4A and 4*b* in more detail) which thus shows a node 300*b* identical to node 300*b* of FIGS. 5 and 6. However, FIG. 7 does not show all the details, e.g. that subscribed signals are received by both component versions (i.e., existing and new).

Other types of input data e.g. from communication with upper system parts, from an I/O scanner or from a communication stack are also synchronized. Input data from upper system parts are received as symbolically shown by arrow 700a, by the communication interface 340b which forwards it to the address space 370d in the existing component as symbolically shown by arrow 700b. The address space 370d sends the input data to the node manager API 360d, as symbolically shown by arrow 700c, which forwards it to the new component as symbolically shown by arrows 700d, 700e. Other input data e.g. received by an I/O scanner in a component, is sent by the existing component to the new component using the node manager API 360d in the same manner. In case the new component is e.g. an I/O scanner, it will not control the I/O and devices during the evaluation. This is handled by the existing component.

Figure 8:
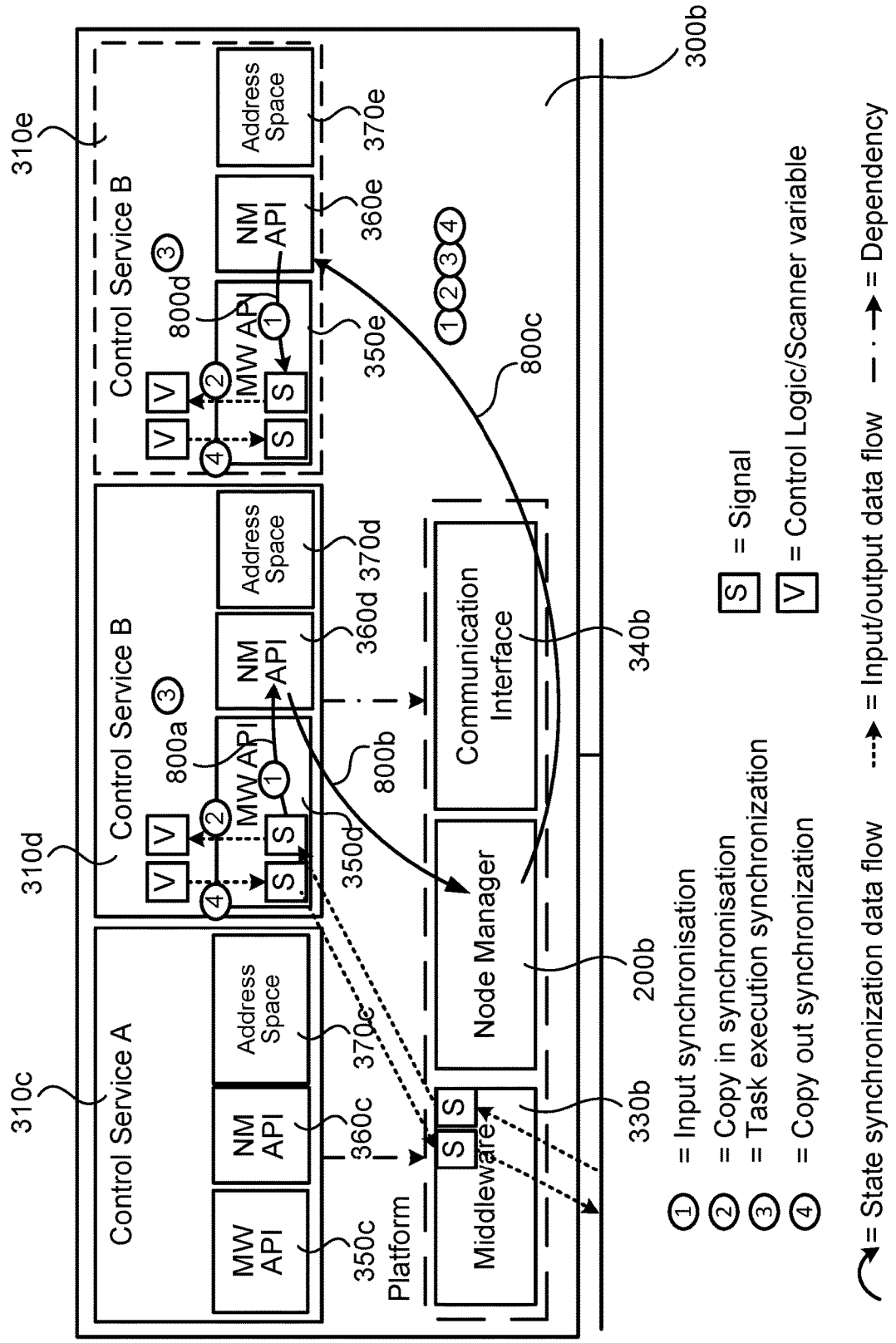
FIG. 8 schematically illustrates synchronization of execution according to an embodiment.

The executions of the component to be reconfigured are synchronized, i.e. synchronization of input data as described above, copying signal values to internal variables, executing the control or scanner logic etc., and copying internal variable values to the signals. In this respect, the middleware API 350 triggers the synchronization (e.g. copy-in, execute, copy-out, input data sync) using the node manager API 360, which forwards the synchronization information using the infrastructure as described above, and as symbolically shown by arrows 800b, 800c, 800d in FIG. 8, which thus shows a node 300b identical to node 300b of FIGS. 5, 6 and 7.

As the existing component and the new component expose the same entities in address space, the new component in some aspects uses a separate namespace, an evaluation namespace, for its entities. Hence, according to an embodiment, a temporary namespace is used for each new component when evaluating the performance in process block S112. For example, a specific control logic variable will have the same item ID in the existing component as in the new component, but different namespace IDs.

The communication interface 340a, 340b can be used to read control logic or I/O scanner variables values, signal values etc. The reconfiguration tool might be configured to evaluate potential differences in runtime behavior and dynamics, by reading values from both namespaces, the ordinary namespace and the evaluation namespace. The reconfiguration tool uses the namespace ID to identify which component (i.e., the existing component or the new component) to request for the value. The address space 370a-370e of the requested control service uses the item ID to find the corresponding entity.

A control service has no knowledge about where its control service communication partners are allocated. Therefore, a control service that publishes a data set (a group of signals) can be replaced by another control service in the same node 300a or in a different node 300b without affecting the subscriber(s) of the data set, and a control service that subscribes to a data set can be replaced by another control service in the same node 300a or in a different node 300b without affecting the publisher of the data set.

Figure 9:
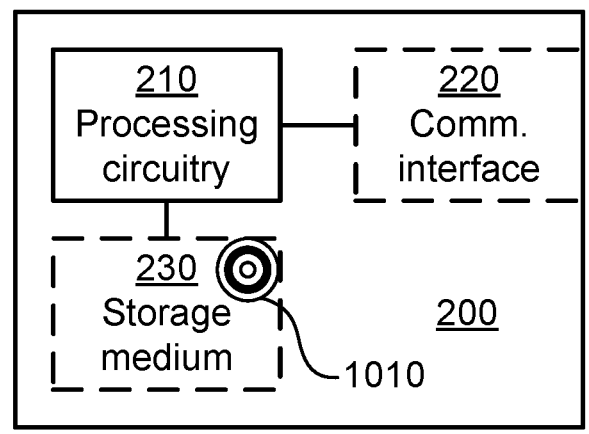
FIG. 9 is a schematic diagram showing functional units of a node manager according to an embodiment.

FIG. 9 schematically illustrates, in terms of a number of functional units, the components of a node manager 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the node manager 200a to perform a set of operations, or process blocks, as disclosed above. For example, the storage medium 230 may store the set of operations, and the processing circuitry 210 may be configured to retrieve the set of operations from the storage medium 230 to cause the node manager 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The node manager 200a may further comprise a communications interface 220 at least configured for communications with other components of the node 300. As such the communications interface 220 may comprise one or more transmitters and receivers, comprising analogue and digital components. The processing circuitry 210 controls the general operation of the node manager 200a e.g. by sending data and control signals to the communications interface 220 and the storage medium 230, by receiving data and reports from the communications interface 220, and by retrieving data and instructions from the storage medium 230. Other components, as well as the related functionality, of the node manager 200a are omitted in order not to obscure the concepts presented herein.

As disclosed above, the node manager 200a might be provided as a component of a node 300 and may hence share resources, such as processing circuitry 210, etc. with the node 300 as needed.

Figure 10:
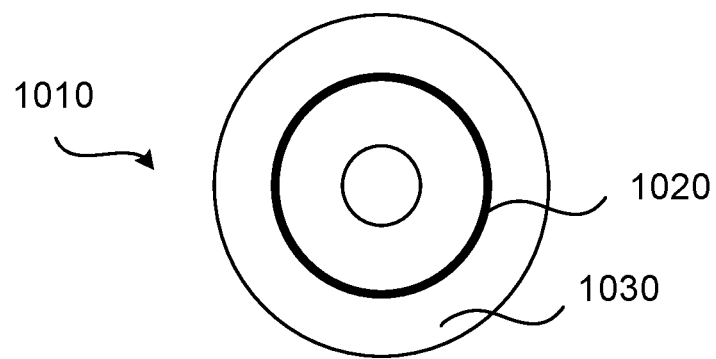
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for online reconfiguration of a node in a process control system, wherein the node includes components, where each component is a separate executable running in a separate operating system process as provided by a real time operating system of the node, the method being performed by a node manager of the node to be reconfigured, the method comprising the steps of:
triggering, based on new configuration data and whilst running at least one of the components to be reconfigured, creation of a new configuration entity for each of the at least one of the components to be reconfigured, the creating involving implementing, by each new configuration entity, a part of the reconfiguration corresponding to its component to be reconfigured;
triggering synchronization of runtime data in each new configuration entity with runtime data of its corresponding existing configuration entity; and
triggering replacement of the existing configuration entity with its new configuration entity and thereby reconfiguring the node.

2. The method according to claim 1, further comprising: triggering creation of each new configuration entity within the component to be reconfigured.

3. The method according to claim 1, further comprising: triggering, whilst running the at least one of the components to be reconfigured, creation of a new component for each of the at least one of the components to be reconfigured such that each new component is implementing a part of the reconfiguration corresponding to its component to be reconfigured, and where each new component is a separate executable running in a separate operating system process as provided by the real time operating system of the node.

4. The method according to claim 1, wherein the at least one component to be reconfigured is a control service component and/or a platform component on which the control service component is running.

5. A node manager for online reconfiguration of a node in a process control system, wherein the node comprises components, where each component is a separate executable running in a separate operating system process as provided by a real time operating system of the node, the node manager comprising processing circuitry, the processing circuitry being configured to cause the node manager to perform a method according to claim 1.

6. The method according to claim 3, further comprising: triggering creation of each new configuration entity within the new component for each of the at least one of the components to be reconfigured.

7. The method according to claim 3, wherein the reconfiguration is provided to a node manager Application Programming Interface (API) of the new component.

8. The method according to claim 3, further comprising: evaluating performance of each new component after synchronizing the runtime data but before replacing the existing configuration entity with its new configuration entity.

9. The method according to claim 4, wherein the control service component comprises a middleware API, the node manager API, and an address space.

10. The method according to claim 4, wherein the platform component comprises middleware, the node manager, and a communication interface.

11. The method according to claim 6, wherein the reconfiguration is provided to a node manager Application Programming Interface (API) of the new component.

12. The method according to claim 6, further comprising: evaluating performance of each new component after synchronizing the runtime data but before replacing the existing configuration entity with its new configuration entity.

13. The method according to claim 7, further comprising: evaluating performance of each new component after synchronizing the runtime data but before replacing the existing configuration entity with its new configuration entity.

14. The method according to claim 8, wherein evaluating the performance comprises:
starting parallel execution of each new component and the at least one component to be reconfigured, wherein each new component and the at least one component to be reconfigured are run with same input;
processing in the control system an output generated from execution of the at least one component to be reconfigured;
verifying that each new component produces expected output; and
stopping, based on the verifying, execution of each new component and the at least one component to be reconfigured.

15. The method according to claim 8, wherein a temporary namespace is used for each new component when evaluating the performance.

16. The method according to claim 8,
wherein the at least one component to be reconfigured is a control service component and/or a platform component on which the control service component is running, and
wherein the evaluating is only performed when it is the control service component that is to be reconfigured.

17. The method according to claim 14, wherein each new component is, via the node manager, provided with the input from its corresponding component to be reconfigured.

18. A computer program for online reconfiguration of a node in a process control system, wherein the node comprises components, where each component is a separate executable running in a separate operating system process as provided by a real time operating system of the node, the computer program comprising computer code which, when run on processing circuitry of a node manager, causes the node manager to perform a method including the steps of:
triggering, based on new configuration data and whilst running at least one of the components to be reconfigured, creation of a new configuration entity for each of the at least one of the components to be reconfigured, the creating involving implementing, by each new configuration entity, a part of the reconfiguration corresponding to its component to be reconfigured;
triggering synchronization of runtime data in each new configuration entity with runtime data of its corresponding existing configuration entity; and
triggering replacement of the existing configuration entity with its new configuration entity and thereby reconfiguring the node.

* * * * *